Patented Sept. 14, 1948

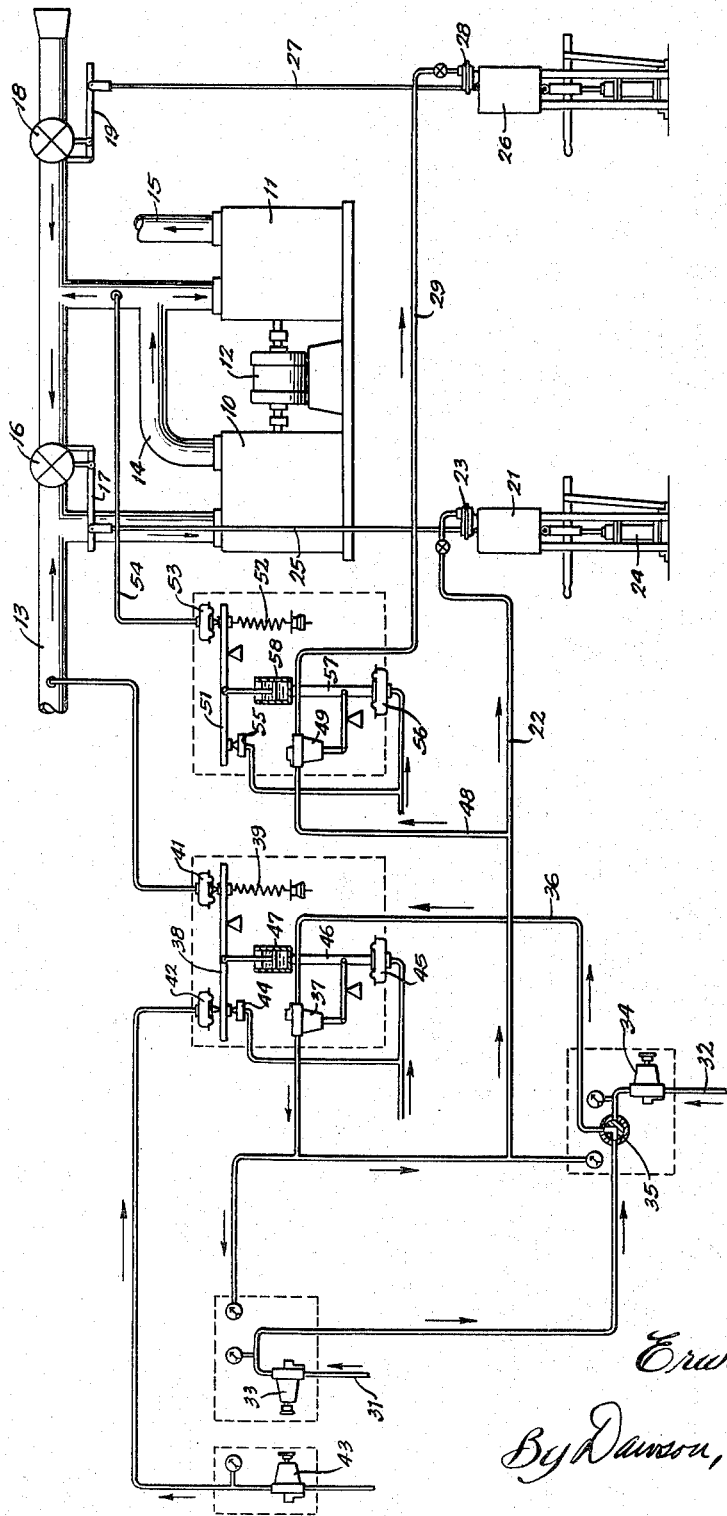

2,449,217

UNITED STATES PATENT OFFICE 2,449,217

REGULATING APPARATUS

Erwin W. Graham, Lakewood, Ohio, assignor to Republic Flow Meters Company, Chicago, Ill., a corporation of Illinois Application June 14, 1944, Serial No. 540,273

8 Claims. (Cl. 230—2)

This invention relates to regulating apparatus and more particularly to apparatus for controlling a condition manually or automatically in response to variations in the condition.

An object of the invention is to provide a regulating apparatus in which manual and automatic controllers are arranged in series so that each controller limits the control operations of the other.

Another object is to provide regulating apparatus for a two stage suction pump in which a by-pass valve around the first stage is opened prior to opening of a bleed valve into the second stage. Preferably, both valves are controlled in response to the suction at the first stage inlet and the bleed valve is additionally controlled in response to the suction at the inlet of the second stage.

The above and other objects and advantages of the invention will be more readily apparent from the following description when read in connection with the accompanying drawing, in which—

The single figure is a diagrammatic view of regulating apparatus embodying the invention.

The invention is illustrated in a regulating apparatus for controlling a two stage suction pump including a first stage pump 10 and a second stage pump 11 both driven by a motor 12. The inlet to the first pump is connected to a line 13 which is to be maintained under suction. The outlet of the first pump is connected thru a pipe 14 to the inlet of the second pump and the outlet of the second pump shown at 15, may discharge to atmosphere.

A by-pass valve 16 is provided between the outlet and inlet of the first pump and may be controlled thru a lever 17. A bleed valve 18 controlled thru a lever 19 is provided to bleed air from the atmosphere into the inlet of the second pump.

The valve 16 is controlled by a regulator 21 operated in response to a loading pressure supplied thru a pipe 22 to a diaphragm 23 on the regulator. The regulator includes a power cylinder 24, connected thru a rod 25 to the lever 17, to control the valve 16. The regulator is so connected that an increase in pressure on the diaphragm 23 tends to close the valve 16. A second regulator 26 similar to the regulator 21, is connected thru a rod 27 to the lever 19 to control the valve 18. This regulator also tends to close the valve in response to an increase in loading pressure applied to a control diaphragm 28 thereon thru a pipe 29.

Loading pressure for the regulators is supplied thru either of two supply pipes 31 or 32, thru manual controllers 33 and 34. The controllers 33 and 34 are conventional type pressure regulators which limit the maximum value of the loading pressure at their outlet sides. A transfer valve 35 connects one or the other of the controllers 33 and 34 to a pipe 36. It will be understood that the two manual controllers are provided so that the system may be controlled manually from either of two points and that one or the other of the controllers may be made effective by moving the transfer valve.

The pipe 36 is connected thru a pressure controlling valve 37 to the pipe 22. The valve 37 forms a part of an automatic controller including a balance beam 38 urged in one direction by a spring 39 opposed by a diaphragm 41 which is responsive to suction in the pipe 13. The spring is balanced by a diaphragm 42 which is supplied with pressure from a manually adjustable pressure controlling valve 43 by which the suction to be maintained in the pipe 13 can be adjusted. The beam 38 controls escape of air from an orifice 44 which is supplied with air from any desired source and which controls a pressure beneath a diaphragm 45. The diaphragm 45 moves a rod 46 which is connected to the valve 37 to adjust it and which is also connected thru a dash pot 47 to the beam 38 to stabilize it.

The pipe 22 is connected as shown directly to the diaphragm 23 and thru a branch pipe 48 to a pressure controlling valve 49 which is connected to the pipe 29. The valve 49 forms a part of a second automatic controller including a balance beam 51 urged in one direction by a spring 52 and in the opposite direction by a diaphragm 53 connected thru a pipe 54 to the inlet of the second suction pump. The valve 51 controls the escape of air from a nozzle 52 which regulates the pressure below a diaphragm 53. The diaphragm 53 is connected thru a rod 54 to the valve 49 and thru a dash pot 55 to the beam 51 to stabilize it.

In operation the pressure on the diaphragm 42 may be set thru the valve 43 to any desired suction value which is to be maintained automatically. Fluid to load the diaphragms 23 and 28 is supplied to the system from one or the other of the pipes 31 and 32, depending on the setting of the transfer valve 35. The pressure is regulated by the setting of one or the other of the valves 33 or 34 so that it can never exceed the value for which the valve is set. The valve 37 is controlled automatically in response to variations in suction in the line 13 to vary the loading pressure conducted to the regulators thru the pipe 22 so that if the suction in pipe 13 increases above the desired value the valve 37 will reduce the loading pressure. The regulator 21 is adjusted to be responsive to a higher loading pressure than the regulator 26 so that it will be operated first. For example, if the loading pressure is reduced by the valve 37 to a value below 10 inches of water, the regulator 21 will start to open the valve 16. This will by-pass air from the outlet of the first pump 10 to its inlet to reduce the suction in the pipe 13 to the desired value. If the valve 16 should become fully opened as might occur, for example, when the loading pressure is reduced to 5 inches of water, the regulator 26 will become effective to start opening the valve 18. The regulator 26 may be so adjusted that it will start opening the valve 18 at a loading pressure of 5 inches of water and will have this valve fully opened when the loading pressure reaches approximately zero. Thus the valves 16 and 18 are controlled in sequence, first to by-pass air around the first pump stage and second, to bleed air into the second pump stage.

The loading pressure on the diaphragm 28 is further controlled by the valve 49 in response to the suction at the inlet of the second stage. If, for any reason, the suction at this point should become too high while the suction in the pipe 13 is at the desired value, the valve 18 will be opened to bleed air into the second stage pump 11. Thus this pump is protected independently of the first stage pump.

For manual control either of the valves 33 or 34 may be adjusted to reduce the loading pressure supplied to the line 36. In this way, the pressure in the pipe 13 can be controlled manually to increase it above the value for which the automatic controller is set. However, manual operation of valves 33 and 34 can never produce a suction in the pipe 13 higher than that for which the automatic controller is set since any increase of loading pressure in the pipe 36 will be reduced by the valve 37 to the value for which the automatic-controller is adjusted. Thus, the manual and automatic controllers operate as limiting devices for each other to prevent any effort of the control mechanism to cause a higher suction in the pipe 13 than can safely be produced by the pumps.

While one embodiment of the invention has been shown and described in detail herein, it will be understood that this is illustrative only and is not intended as a definition of the scope of the invention, reference being had for this purpose to the appended claims.

What is claimed is:

1. Regulating apparatus comprising a regulator adapted to operate control means to vary a condition to be controlled in response to a loading pressure, a conduit to conduct loading pressure to the regulator, a manually adjustable controller in the conduit adjustable to limit the maximum value of the loading pressure, and an automatic controller in the conduit in series with the manual controller to vary the loading pressure automatically in response to variations in the condition whereby the automatic and manual controllers serve as limiting devices for each other.

2. Regulating apparatus comprising a regulator adapted to operate control means to vary a condition to be controlled in response to a loading pressure, a conduit to conduct loading pressure to the regulator, a manually adjustable controller in the conduit adjustable to limit the maximum value of the loading pressure, an automatic controller in the conduit to vary the loading pressure automatically in response to variations in the condition to tend to keep the condition constant, and means to vary the loading on the automatic controller to vary the value at which it tends to keep the condition, the manual and automatic controllers being in series whereby they serve as limiting devices for each other.

3. Regulating apparatus comprising a regulator adapted to operate control means to vary a condition to be controlled in response to a loading force, means connected to the regulator to supply a loading force thereto, a manually operable controller connected to said means adjustable to limit the maximum value of the loading force manually, and an automatic controller connected to said means to vary the loading force automatically in response to changes in the condition, the manual and automatic controllers being in series whereby they serve as limiting devices for each other.

4. Regulating apparatus for controlling a fluid pressure comprising a regulator adapted to operate control means to vary the pressure, means connected to the regulator to supply a loading force thereto, a manually operable controller connected to said means to vary the loading force manually, and an automatic controller connected to said means to vary the loading force automatically including a balance member urged in one direction by a force variable with changes in the fluid pressure and urged in the other direction by a manually adjustable force, the manual and automatic controllers being in series whereby they serve as limiting devices for each other.

5. Regulating apparatus for controlling a two stage suction pump comprising a by-pass valve between the outlet and inlet of the first stage, a first regulator for controlling the valve in response to a loading force, a bleed valve connected to the inlet of the second stage, a second regulator controlling the bleed valve in response to a loading force, manual means to vary the loading force, and automatic means to vary the loading force in response to the suction at the inlet to the first stage, the manual and automatic means being in series to serve as limiting devices for each other.

6. Regulating apparatus for controlling a two stage suction pump comprising a by-pass valve between the outlet and inlet of the first stage, a first regulator for controlling the valve in response to a loading force, a bleed valve connected to the inlet of the second stage, a second regulator controlling the bleed valve in response to a loading force, a single source of loading force for both of the regulators, and a controller responsive to the suction at the inlet to the first stage to vary the loading forces, the regulators being responsive to different loading forces whereby the by-pass valve will be opened before the bleed valve opens.

7. Regulating apparatus for controlling a two stage suction pump comprising a by-pass valve between the outlet and inlet of the first stage, a first regulator for controlling the valve in response to a loading force, a bleed valve connected to the inlet of the second stage, a second regulator controlling the bleed valve in response to a loading force, a single source of loading force, a controller responsive to the suction at the inlet to the first stage to control the loading force for both regulators, and a controller responsive to the suction at the inlet to the second stage to control the loading force for the second regulator.

8. Regulating apparatus for controlling a two stage suction pump comprising a by-pass valve between the outlet and inlet of the first stage, a first regulator for controlling the valve in response to a loading force, a bleed valve connected to the inlet of the second stage, a second regulator controlling the bleed valve in response to a loading force, a single source of loading force for both regulators, a manual controller to vary the loading force, a first automatic controller responsive to the suction at the inlet to the first stage to control the loading force, the manual and automatic controllers being in series between the source and both regulators, and a second automatic controller between the manual and first automatic controllers to control the loading force for the second regulator only in response to the suction at the inlet to the second stage.

ERWIN W. GRAHAM.

REFERENCES CITED

The following references are of record in the file of this patent:

UNITED STATES PATENTS

| Number | Name | Date |
|---|---|---|
| 685,704 | Wilkinson | Oct. 29, 1901 |
| 1,987,032 | Spence | Jan. 8, 1935 |
| 2,138,527 | Newman | Nov. 29, 1938 |
| 2,140,898 | Collens et al. | Dec. 20, 1938 |
| 2,235,138 | Billetter | Mar. 18, 1941 |